UNITED STATES PATENT OFFICE.

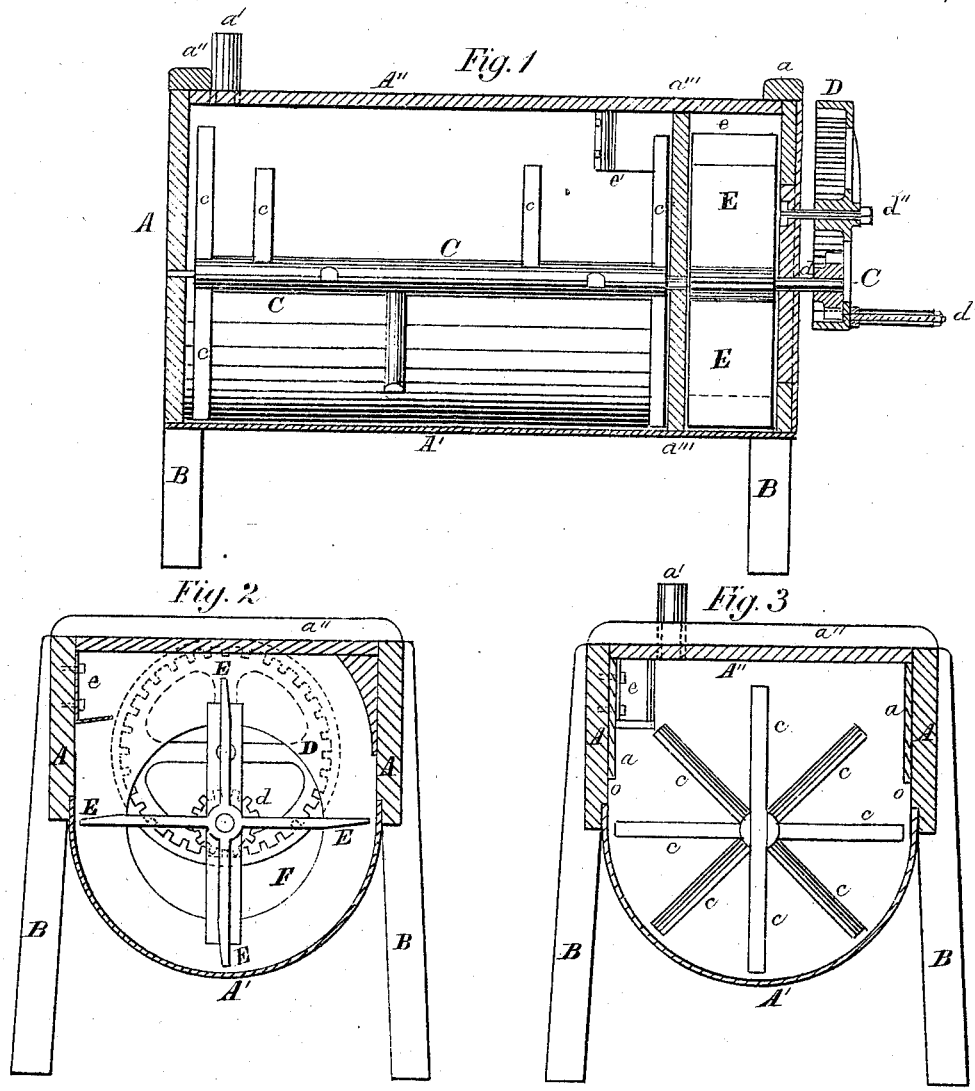
J. W. ARNOLD.
Improvement in Rotary Churns.
No. 131,990. Patented Oct. 8, 1872.

JACOB W. ARNOLD, OF FAIRPORT, NEW YORK.

IMPROVEMENT IN ROTARY CHURNS.

Specification forming part of Letters Patent No. 131,990, dated October 8, 1872.

*To all whom it may concern:*

Be it known that I, JACOB W. ARNOLD, of Fairport, in the county of Monroe, in the State of New York, have invented certain Improvements in Churns, of which the following is a specification:

The object of this invention is to improve upon that kind of churn in which external air is passed in contact with the cream or milk being churned; and it consists in the construction and arrangement of the parts of the churn, as will more fully hereinafter be described.

In the drawing, Figure 1 represents a longitudinal sectional view of the churn, and Figs. 2 and 3 transverse sectional views of same.

A is the body of the churn, of quadrangular form in plan view, having a circular bottom, A', a removable cover, A'', with transverse end pieces $a''$ $a''$ to strengthen the cover. $a$ $a$ are inwardly-projecting side-boards and form offsets $o$ $o$ at their bottom edges. $a'$ is an open vertical tube through the cover or lid A''. B B are legs for supporting the body of the churn. $a'''$ is a transverse partition, dividing the body of the churn into two distinct parts. C is a horizontal shaft, going horizontally through the center of the length of the body of the churn and concentric with the circular bottom A'. $c$ $c$ are radial dashers or beaters, firmly fixed in the shaft C in a spiral direction around the shaft C, and are made to have a flat surface on one side and a rounded surface or half-round the residue of the shape in cross-section, and they can be placed in any desired position with relation to the direction of revolution that may be desired, as they can be placed to have the flat surface toward either end of the chamber for containing the cream, or either the flat or round side forward, but preferably the flat side is toward the head of the churn or the partition, giving the edge the forward or striking position against the cream. E E E E are the wind-fans or wind-wheel on the shaft C and placed in a separate chamber from that containing the cream. This fan is of the same diameter as the revolving dasher-arms $c$. D is a wheel, with internal gear revolving on axle $d''$ by means of crank $d'$. $d$ is a pinion, fast on shaft C and at its end gearing into wheel D. $e$ is an air passage and chute to direct the air into the churn and in contact with the cream or milk being churned, is open toward the fan-wheel to the partition $a'''$, which is cut away the width of the air-passage, and inside the churn the sides of the passage are closed, leaving only an opening at the bottom, where the air is forced downward into the agitated cream.

The air is brought in by the air-fan E, when in revolution, through opening F in the end of the churn-body outside of the fan-chamber, when it is forced into passage $e$, thence through the opening in the partition, and is directed downward through opening $e'$ into the churn, where it is in contact with the cream.

By the current of air of the proper temperature coming in contact and mingling with the agitated cream, the cream is made to be of the same temperature. As the force of the increasing air is directed toward and into the mass of cream the warmer air will be driven out through the vertical open tube $a'$.

The forcing of air, either by a forcing or suction fan, into a churn during the operation of churning is a well-known device, and I do not broadly claim a device whereby air is so brought in contact with the cream, as the devices for so doing have heretofore been applied to the outside of the churn-body, and the wind or air fan-case projecting therefrom, and are always in the way, liable to be detached or broken, and taking up more room and adding more parts and complications than in the churn above described, which is more compact, and has less parts, as the air-fan is upon the same shaft with the revolving dashers, and the air-passage is within the body of the churn.

I am aware of the patent granted to Gallup and Hewitt May 18, 1869, in which the air-fan is upon the dasher-shaft; and I disclaim the construction and arrangement therein shown.

Having thus described my invention, what I claim, and desire to secure by Letters Patent, is—

The churn above described when constructed with the body A having the transverse partition $a'''$, removable cover A'' with air-exit $a'$ therein, horizontal revolving shaft C with dashers or beaters $c$, air-fan E of the same diameter as the dashers, and air-passages $e$ and $e'$, substantially as and for the purpose described.

JACOB W. ARNOLD.

Witnesses:
E. F. CADY,
T. H. DENISE.